April 28, 1936. P. V. HUNTER ET AL 2,038,934
MULTICORE ELECTRIC CABLE
Filed July 23, 1931 2 Sheets-Sheet 2
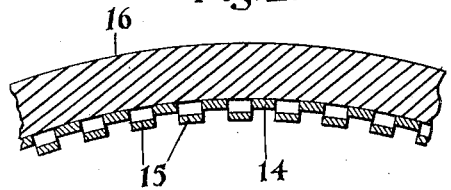
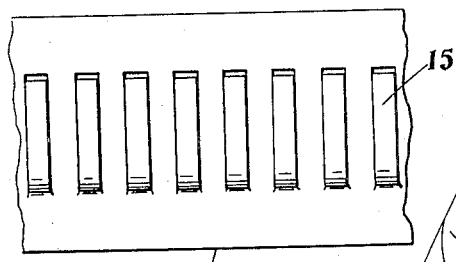
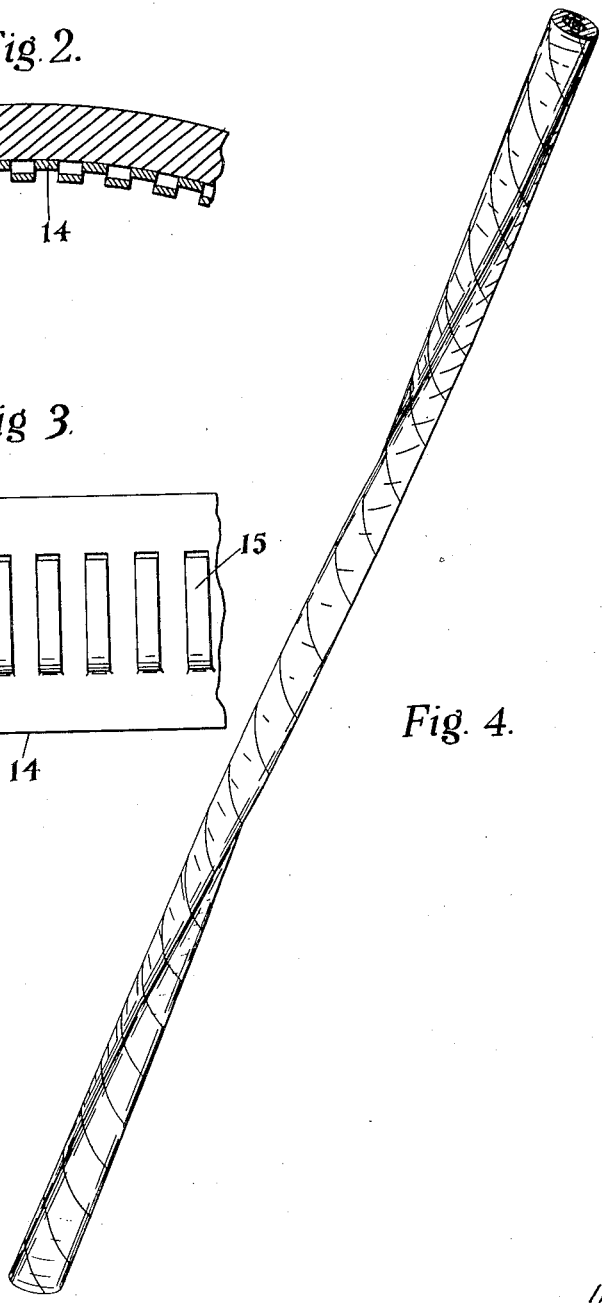
INVENTORS
Philip V. Hunter, John F. Watson &
Leslie G. Brazier
BY
Byrnes, Stebbins, Parmelee & Blenko
ATTORNEYS Patented Apr. 28, 1936

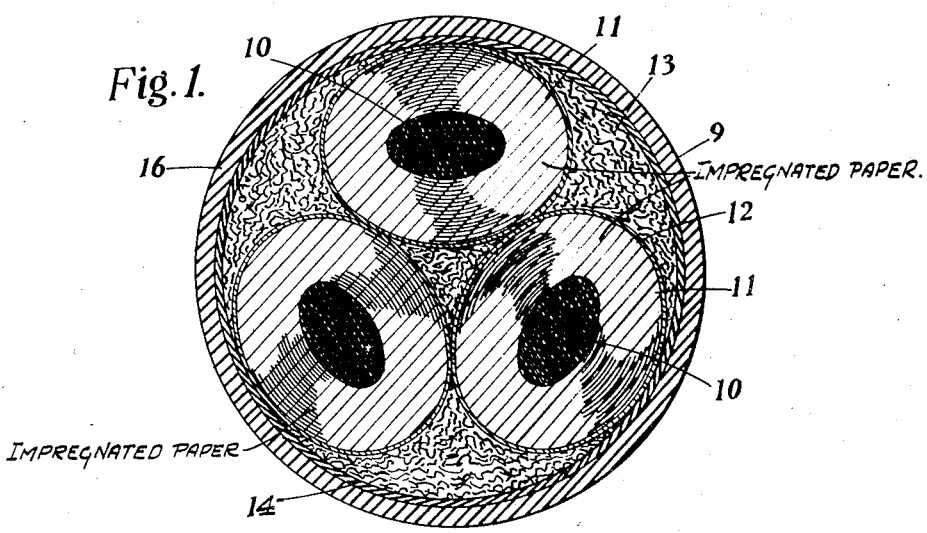

2,038,934

UNITED STATES PATENT OFFICE 2,038,934

MULTICORE ELECTRIC CABLE

Philip Vassar Hunter, London, John Francis Watson, Abbey Wood, and Leslie Giddens Brazier, London, England, assignors to Callender's Cable and Construction Company Limited, London, England, a British company Application July 23, 1931, Serial No. 552,623
In Great Britain August 26, 1930

2 Claims. (Cl. 173—266)

This invention relates to multicore electric cables having insulation formed by a laminated or stratified material (for example, paper lapped on helically in a number of layers) impregnated with liquid or semi-liquid material, for instance, oil or compound. In such cables it is common practice to employ conductors of non-circular cross-section over which the insulation is wound in the form of layers. It has also recently become the practice to make use of pre-spiralled strands for the cores as these cause the cores to assume definite positions in the cable when the cores are laid up together, there being no tendency for the cores to open out as is the case when the conductors are given a straight form. By pre-spiralling according to this specification we mean a strand which before insulating is shaped into the desired non-circular cross-section and also in such a manner that the non-circular configuration rotates about the axis of the strand along its length. This characteristic shape is indicated by Figure 4 of the drawings which shows such a conductor after the application of insulation. Such conductors can be made by known methods. The cores after they have been laid up together are enclosed in a sheath of lead or lead alloy. When the cable is in service, expansion of the cores takes place due to the heat generated by the current in the cable. It is an object of the present invention to provide improved means for permitting this expansion to take place without stretching of the enclosing metal sheath.

In a multicore electric cable according to the present invention, we employ pre-spiralled conductors of non-circular cross-section and a conductive layer around each insulated conductor. When the cores are assembled these conductive layers are in contact with each other and a metal strip having resilient portions is applied helically to the assembled cores. The enclosing sheath is of such dimensions as to provide a small clearance between the assembled cores and the sheath. When the metal strip is in position, this clearance space is not occupied by the thickness of the strip but is bridged by the resilient portions of the strip which yield under the expansion of the cores and maintain contact between the conductive members around the cores and the enclosing sheath so as to maintain the potential of the conductive members at the same value as that of the sheath in spite of the presence of insulating compound beneath the sheath. The resilient portions of the strip may have the form of resilient tongues projecting from the strip. The clearance bridged by these tongues or equivalent members may be quite small, for example, of the order of thirty thousandths of an inch (.74 millimeter) so that the over-all diameter of the cable need not be appreciably increased.

One form of construction in accordance with the invention is illustrated by way of example in the accompanying drawings, wherein, Figure 1 is a section of a three core cable,
Figure 2 is a detail view in section,
Figure 3 is a plan view of the detail shown in Figure 2 and
Figure 4 is a perspective view of a pre-spiralled conductor.

Referring to Figure 1, the cable 9 comprises three conductors 10 laid up together, each being elliptical in cross-section and insulated with impregnated paper 11. Each core is covered with a conducting layer 12 which may be of metal coated paper, and the cores are laid up with loose wormings 13 of suitable material so as to form a body of circular shape in cross-section. The sheath 16 is also of circular form and its inner diameter is slightly greater than that of the cores so as to leave a clearance between these and the inner surface of the sheath. As explained above this clearance between sheath and cores when cold will be of the order of thirty thousandths of an inch and permits the helices of the conductors to increase in diameter without causing undue pressure upon the inner surface of the metal sheath. In the particular construction shown the minor axes of the cores are radial so that the expansion which takes place under working conditions of the cable will be due to the change of shape of the impregnating material enclosed in the layers of the cores and to the expansion of the conductors described above.

In order to ensure that a definite fixed potential is given to the conductive layers 12, a metal tape 14 provided with springy projections 15 is wound over the wormed up cores. The tape is shown conventionally in Figure 1 but the arrangement is shown clearly in Figures 2 and 3. The projections 15 will require to be, when uncompressed, of not more than about twice the radial clearance between the cores and the inner surface of the sheath. The projections extend across the clearance space and form a metallic connection between the conductive layers 12 and the inner surface of the lead sheath. The projections are compressed by the outward movement of the surfaces of the cores towards the sheath without suffering permanent deformation. The projections thus serve as bridging members between the sheath and the layers 12, so that even if there is compound in the space beneath the sheath, the layers 12 are maintained at the same potential as that of the sheath, which is usually at earth potential. When the metal tape 14 is used as an additional wrapping on the outside of the ordinary conducting layers 12 as shown in Figure 1, it can be applied as an open helix and no attempt need be made to secure it in position over the whole of the surface of the cores nor to ensure that it makes good contact at all points where it lies on its surface. It has simply to provide conductive bridges between the surfaces of adjacent cores and the inner surface of the sheath, whilst permitting the expansion described above to take place.

The projections 15 on the metal tape 14 may be produced in various ways, such as by stamping up the centre part only of the tape, as shown in Figure 3. On the other hand a metallized fabric or paper tape may be employed, the projections being produced by threading in and out of the fabric a wire or thin strip of metal such as hard-drawn copper or bronze which is given a wavy shape with the crests of the waves projecting outwards so as to stand appreciably above the surface of the tape when this has been tightly wrapped on the cores.

The space between the sheath and cores may be filled in part with a gas which may be in containers having flexible walls.

What we claim as our invention and desire to secure by Letters Patent is:—

1. A multicore electric cable having a plurality of cores laid up helically, each core comprising a pre-spiralled conductor of non-circular cross-section, a body of laminated insulation around each conductor, and a conductive layer around each body of insulation, and a metal sheath enclosing the cores and of greater internal dimensions than the external dimensions of the cores so as to provide a clearance space between the cores and the sheath, a non-tubular metal strip applied helically to the cores and disposed in the said clearance space, resilient portions, projecting from said metal strip and lying in contact with the conductive layers around the cores to maintain the said layers at the same potential as that of the sheath and also permitting outward movement of the cores without distension of the sheath.

2. A multicore electric cable having a plurality of cores laid up helically, each core comprising a pre-spiralled conductor of non-circular cross-section, a body of laminated insulation around each conductor, and a conductive layer around each body of insulation, and a metal sheath enclosing the cores and of greater internal dimensions than the overall dimensions of the laid up cores so as to provide a clearance space between the cores and sheath, a non-tubular metal strip applied helically to the laid up cores, the said strip having one side thereof lying in contact with the inner surface of the metal sheath and strong tongues projecting from the opposite side of the said strip and inward towards the cores and making contact with the conductive layers round the cores, the said tongues serving to maintain the conductive layers at the same potential as that of the sheath and also permitting outward movement of the cores without distension of the sheath.

PHILIP VASSAR HUNTER.
JOHN FRANCIS WATSON.
LESLIE GIDDENS BRAZIER.